United States Patent
Burns

[11] Patent Number: 5,864,991
[45] Date of Patent: Feb. 2, 1999

[54] MOBILE BOOTH SYSTEM

[76] Inventor: Gary Burns, 2822 Turnberry Dr. #216, Arlington, Tex. 76006

[21] Appl. No.: 2,321

[22] Filed: Jan. 2, 1998

[51] Int. Cl.[6] .................................................. E04B 1/344
[52] U.S. Cl. ........................ 52/67; 52/66; 52/67; 52/71; 52/143; 296/26.09; 296/26.1
[58] Field of Search .................................. 52/66, 67, 71, 52/126.6, 126.1, 198, 143, 64; 296/26.09, 26.1

[56] References Cited

U.S. PATENT DOCUMENTS

| | | | |
|---|---|---|---|
| 712,327 | 10/1902 | Pancoast | 52/198 |
| 1,946,164 | 2/1934 | Houdashelt | 52/64 |
| 2,350,904 | 6/1944 | King | 52/64 |
| 3,194,251 | 7/1965 | Pettersen | 52/66 |
| 3,353,311 | 11/1967 | McClure et al. | 52/71 |
| 3,394,961 | 7/1968 | Matte | 52/64 |
| 3,397,909 | 8/1968 | Gossman | 52/67 |
| 3,463,538 | 8/1969 | Koon | 52/64 |
| 3,608,953 | 9/1971 | Stevens Bernard | 52/66 |
| 3,740,088 | 6/1973 | Ratcliff | 296/26.09 |
| 3,773,380 | 11/1973 | Stockdill | 296/137 |
| 3,811,371 | 5/1974 | Hardy | 98/115 |
| 3,897,100 | 7/1975 | Gardner | 296/10 |
| 4,232,488 | 11/1980 | Hanley | 52/71 |
| 4,425,870 | 1/1984 | Marshke | 118/326 |
| 4,467,572 | 8/1984 | Somer et al. | 52/143 |
| 4,518,194 | 5/1985 | Kirkham et al. | 296/100 |
| 4,633,626 | 1/1987 | Freeman | 52/126.6 |
| 4,932,316 | 6/1990 | Josefsson | 98/115.2 |
| 5,040,482 | 8/1991 | McGuire et al. | 118/326 |
| 5,173,118 | 12/1992 | Josefsson | 118/309 |
| 5,416,965 | 5/1995 | Mayhugh | 296/26.09 |
| 5,470,124 | 11/1995 | Ernst | 296/100 |
| 5,524,953 | 6/1996 | Shaer | 296/100 |
| 5,531,497 | 7/1996 | Cheng | 296/100 |
| 5,658,032 | 8/1997 | Gardner | 296/26.09 |

*Primary Examiner*—Carl D. Friedman
*Assistant Examiner*—Phi Dieu Tran A
*Attorney, Agent, or Firm*—Goldstein & Canino

[57] ABSTRACT

A mobile booth, which is mounted upon a truck, comprising a primary housing and a canopy that is slidably mounted exterior to the primary housing. The canopy is mounted to the primary housing with a roller track. The canopy comprises a top panel, and side panels that are hingeably connected thereto. The side panels have a tri-partite construction, including an upper panel, middle panel, and lower panel which are hingeably connected to allow an enclosure created by canopy to be wider than the truck. To deploy the canopy, the middle panel and lower panel are lowered to the ground, and the truck is pulled forward until the primary housing is forward of substantially all of the canopy. Hydraulic jacks may extend downwardly from the primary housing to selectively engage the ground surface, raise the primary housing slightly, and allow the truck to be driven away to create a semi-permanent installation.

8 Claims, 5 Drawing Sheets

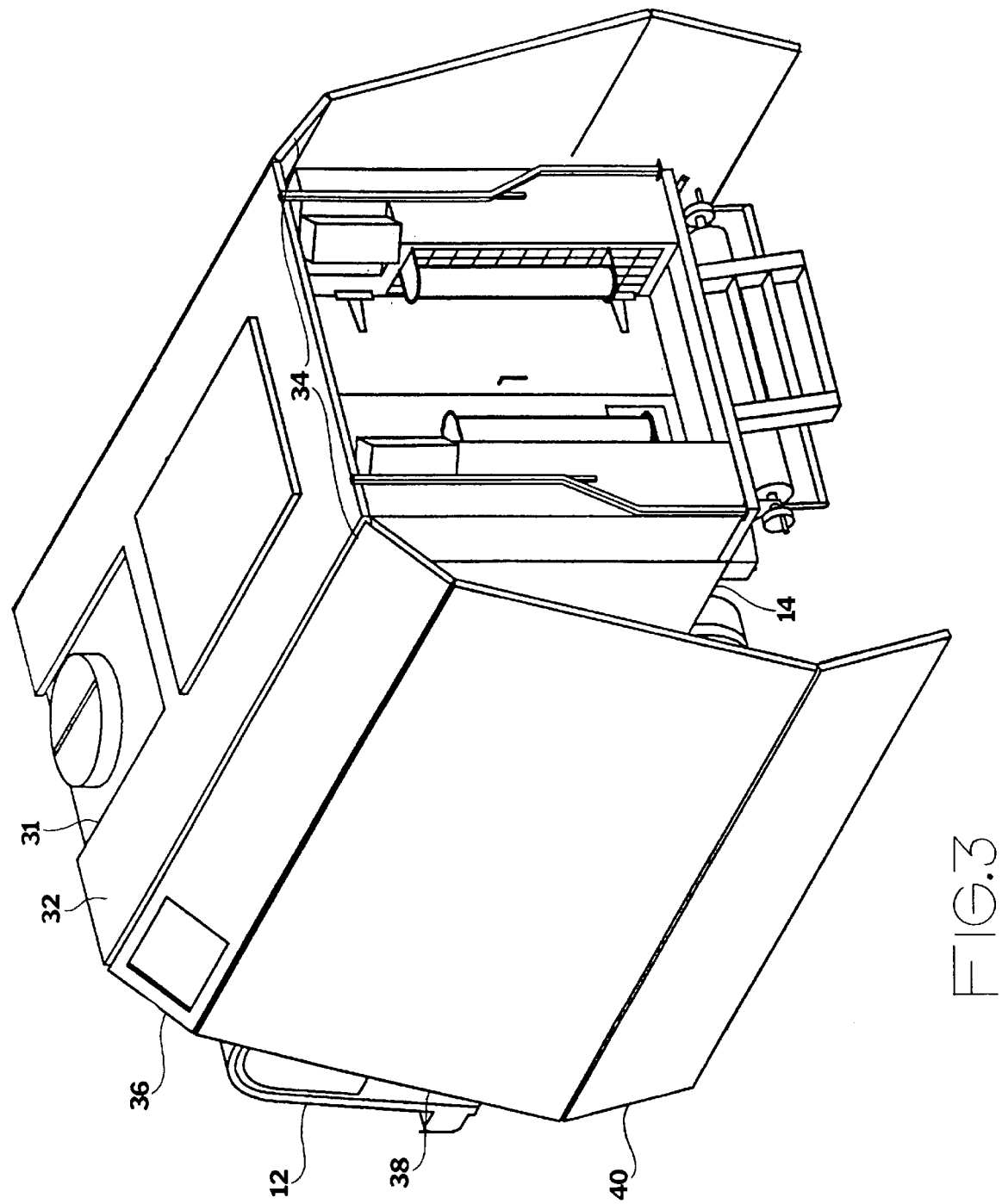

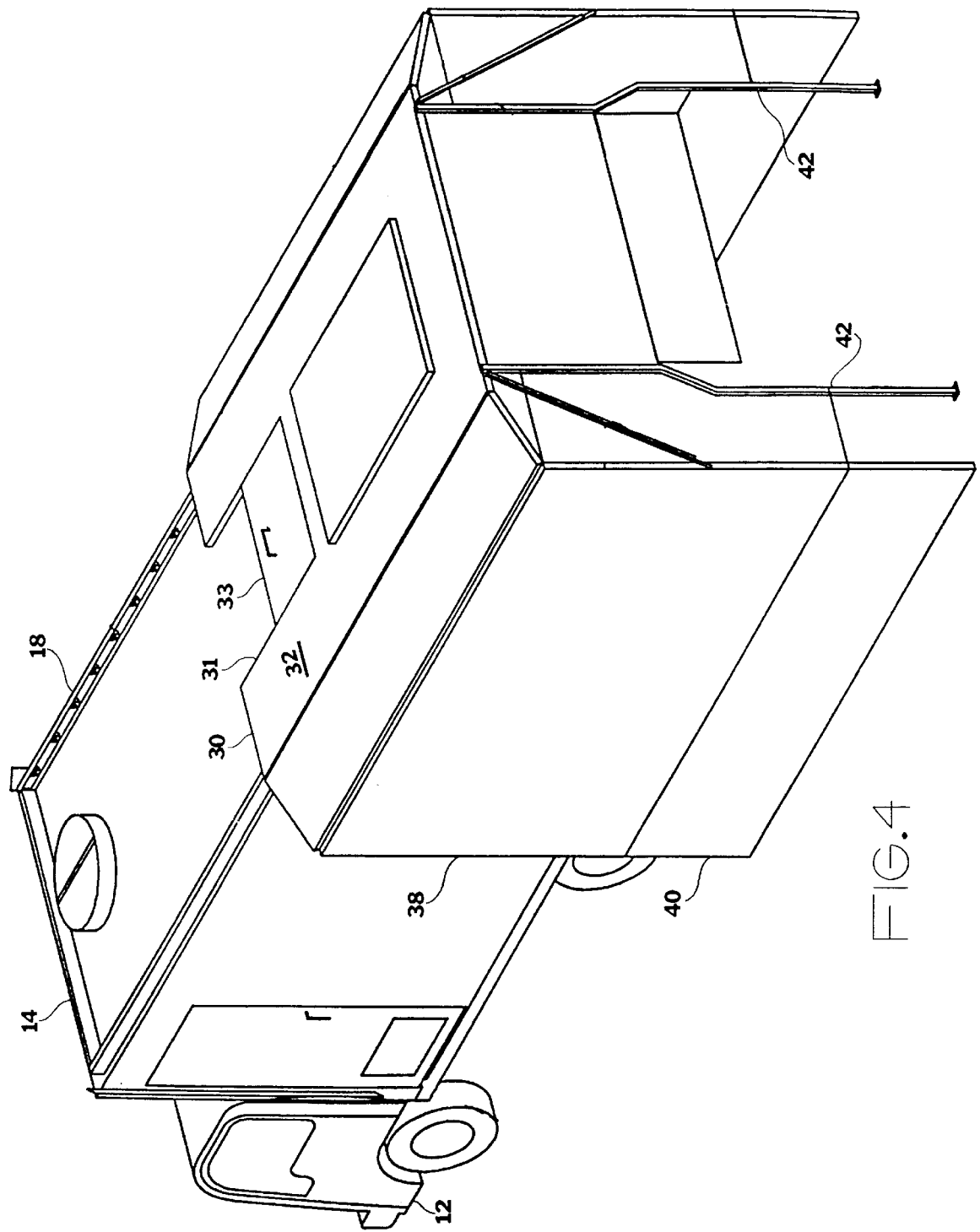

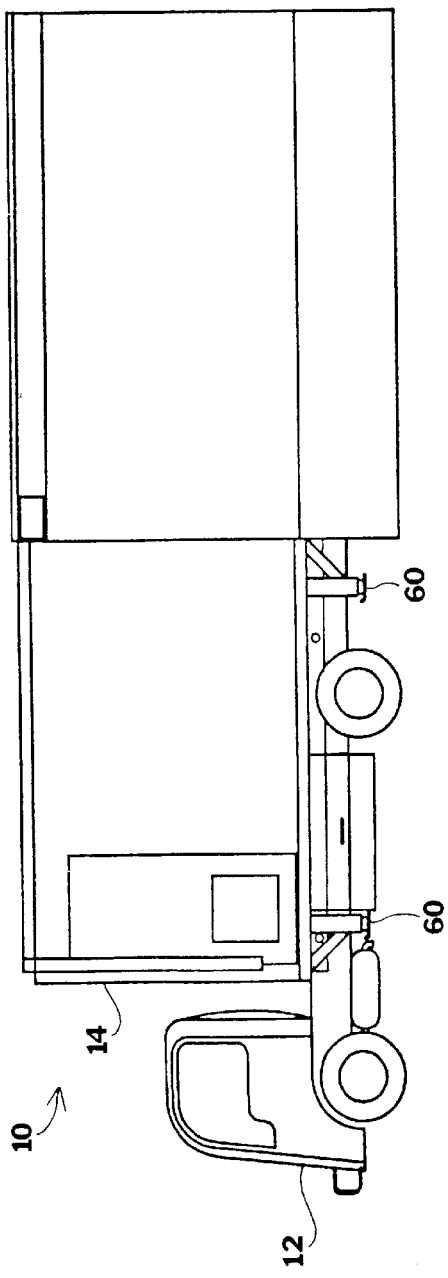
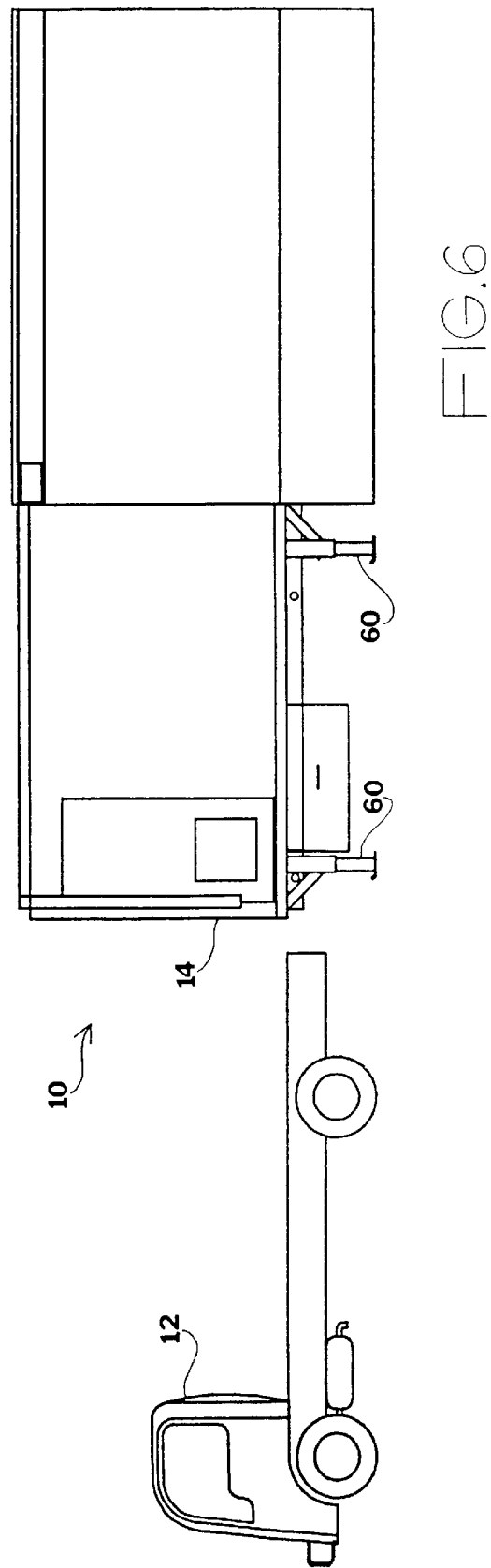

MOBILE BOOTH SYSTEM

BACKGROUND OF THE INVENTION

The invention relates to a mobile booth system. More particularly, the invention relates to a truck mounted system which can create a temporary enclosure suitable for use as a spray booth.

Application of paints or chemicals by spraying involves atomizing the paint or chemical using pressurized air, creating a fine mist. This mist is directed toward the surface being sprayed, known as a "workpiece". Although the majority of the paint or chemical adheres to the surface, a large percentage does not, and is kindly referred to as "overspray".

Overspray is an unavoidable yet problematic by-product of spraying. In a confined space, such as a garage, overspray can get onto everything and into every nook and cranny of the space. Even outdoors, overspray can travel much further than one would expect. Paint overspray can add color to objects which we would otherwise prefer not to paint. However, overspray of solvents can actually be harmful to property and living organisms. Further, toxic paints such as IMRON are being used with increasing frequency. These mist produced by these paints must be contained, since fumes from their vehicles or solvents can cause severe respiratory damage or other health problems.

A common way to control overspray and contain fumes, is to perform all spraying in a confined space around the workpiece, known as a "spray booth". Typically spray booths are isolated, ventilated, climate controlled areas inside a structure where spraying can safely be conducted without harm to property.

It is not always possible to bring the workpiece to a spray booth. For instance, it is often desirable to paint an automobile undergoing restoration while the automobile is not fully mechanically restored, and thus not movable.

U.S. Pat. Nos. 3,811,371 to Hardy; 4,425,870 to Marshke; 4,932,316 to Josefsson; 5,040,482 to McGuire et al.; and 5,173,118 to Josefson each disclose different spray booth configurations. All of these configurations involves a permanent structure—none provide any sort of portability.

U.S. Pat. Nos. 3,897,100 to Gardner; 3,883,380 to Stockdill; and 5,470,124 to Ernst each disclose truck bed covers which attach onto a pickup truck. These devices all slide onto the truck by means of a rail assembly that is mounted along the upper perimeter of the truck bed. None of these devices provide any sort of enclosure aside from that created between the truck bed and cover.

While these units may be suitable for the particular purpose employed, or for general use, they would not be as suitable for the purposes of the present invention as disclosed hereafter.

SUMMARY OF THE INVENTION

It is an object of the invention to produce a mobile booth system which creates a portable enclosure at any desired location. The system is carried by a truck, and then is easily deployable to create the enclosure.

It is another object of the invention to provide an enclosure capable of containing overspray and any fumes created by virtually any commercial spraying operation. The invention prevents further harm to the environment by also providing provisions for covering the ground beneath the workpiece.

It is a further object of the invention that the mobile booth system provides additional uses beyond functioning as a spray booth, such as providing temporary shelter against the elements for persons and goods, functioning as a display booth at trade shows and promotional events, and as vehicle storage during races and specialty car exhibits.

The invention is a mobile booth, which is mounted upon a truck, comprising a primary housing and a canopy that is slidably mounted exterior to the primary housing. The canopy is mounted to the primary housing with a roller track. The canopy comprises a top panel, and side panels that are hingeably connected thereto. The side panels have a tri-partite construction, including an upper panel, middle panel, and lower panel which are hingeably connected to allow an enclosure created by canopy to be wider than the truck. To deploy the canopy, the middle panel and lower panel are lowered to the ground, and the truck is pulled forward until the primary housing is forward of substantially all of the canopy. Hydraulic jacks may extend downwardly from the primary housing to selectively engage the ground surface, raise the primary housing slightly, and allow the truck to be driven away to create a semi-permanent installation.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 3 is a diagrammatic perspective view, illustrating the outer canopy in a state of partial deployment.

FIG. 4 is a diagrammatic perspective view, illustrating the outer canopy fully deployed and slid rearward of the primary housing.

FIG. 5 is a side elevational view, illustrating the invention ready to be deployed as a semi-permanent installation.

FIG. 6 is a side elevational view, wherein the invention has been deployed as a semi-permanent installation.

DETAILED DESCRIPTION OF THE PREFERRED EMBODIMENTS

Figure 1:
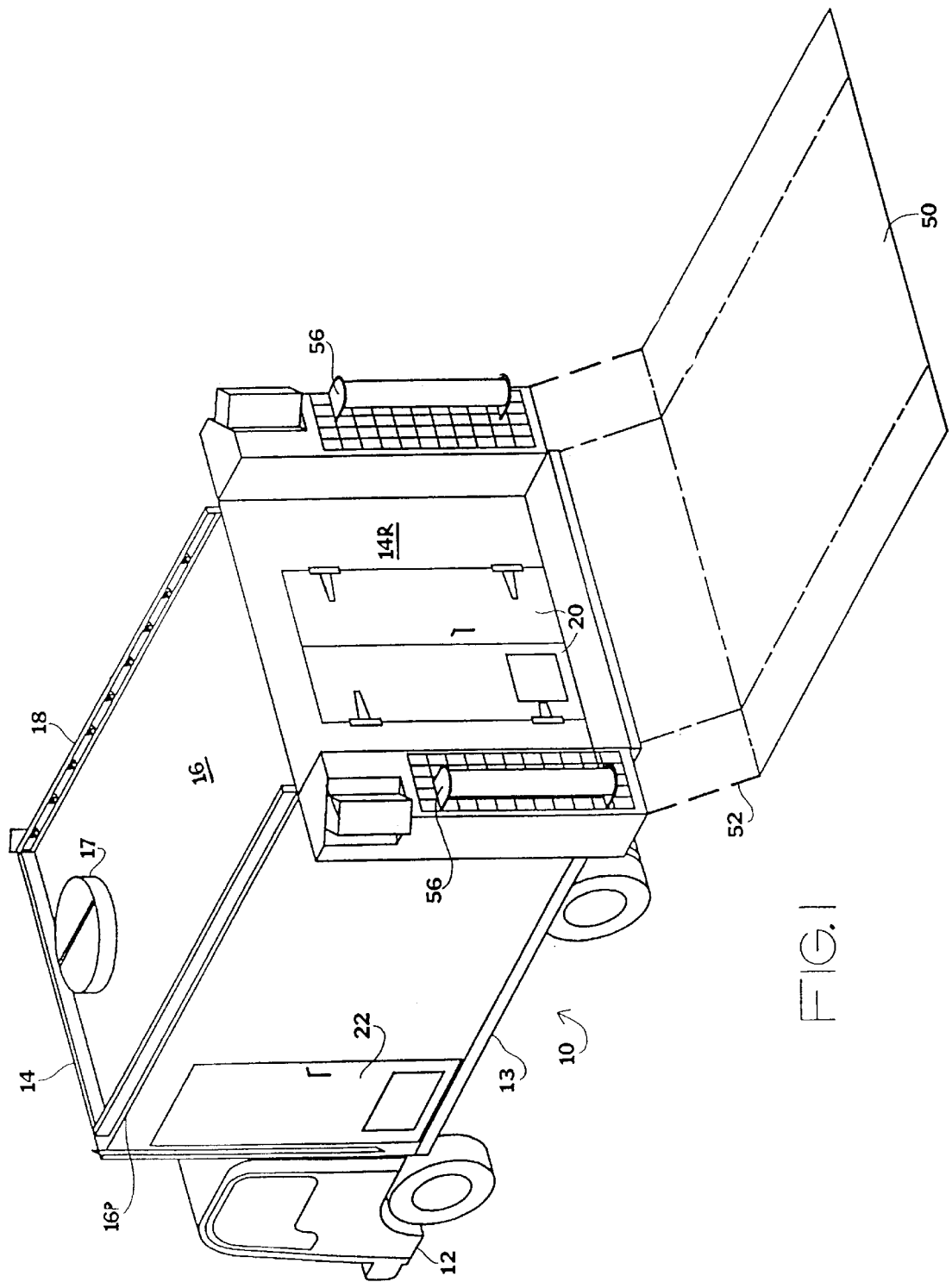
FIG. 1 is a diagrammatic perspective view, illustrating the invention wherein the outer canopy has been removed, revealing the roller assembly, and wherein the floor tarpaulin has been deployed.

FIG. 1 illustrates a mobile booth 10 mounted onto a truck 12 having a truck bed 13. The mobile booth 10 comprises a primary housing 14 having a primary housing rear 14R, and a primary housing roof 16 having a primary housing roof perimeter 16P. A roller track 18 extends rearwardly along the primary housing roof perimeter 16P. The primary housing 14 defines a primary housing interior, which is accessible through rear access doors 20 and one or more optional side access doors 22. The primary housing 14 comprises an air exhaust unit 17 extending through the primary housing roof 16 to the primary housing interior.

Figure 2:
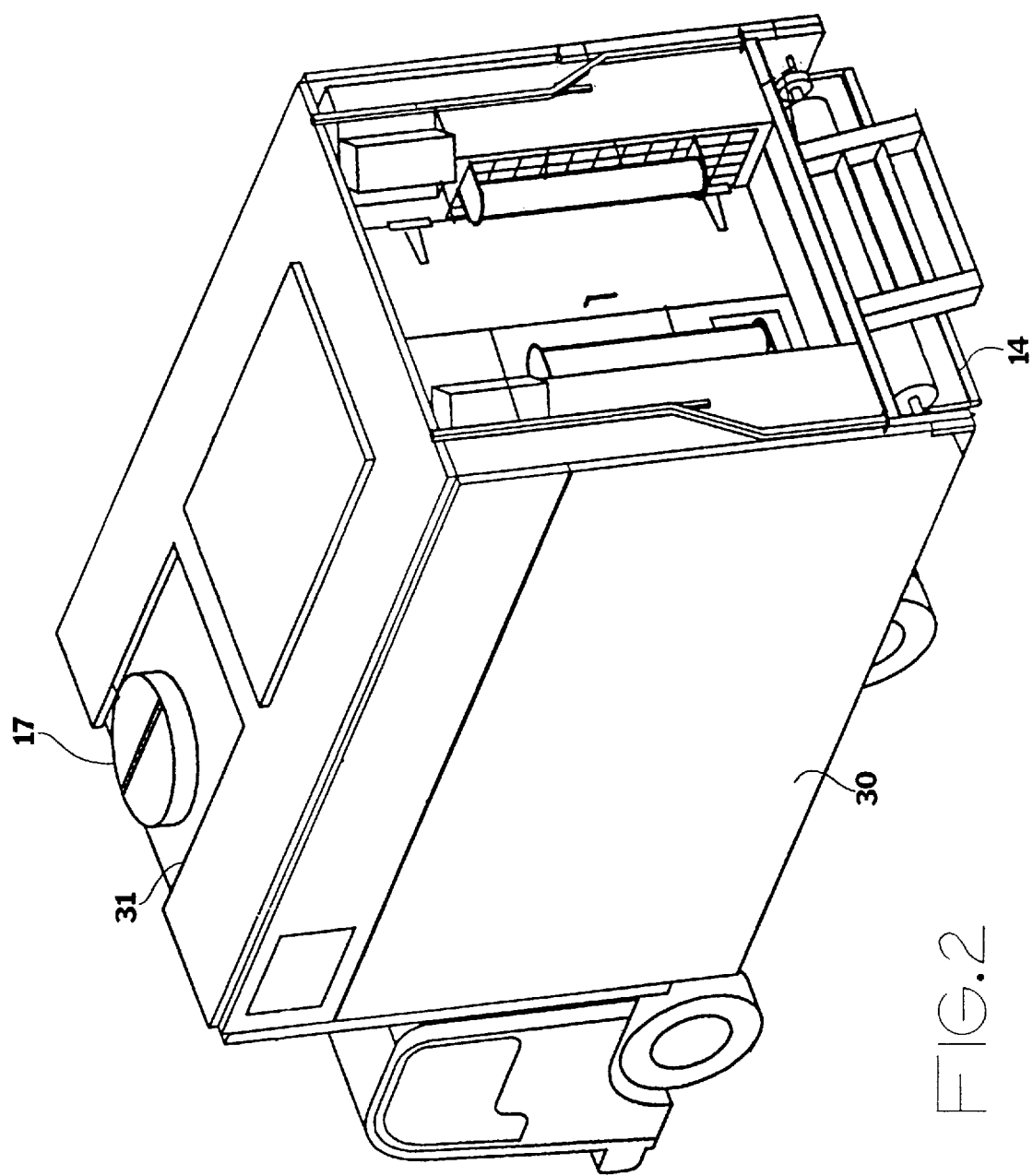
FIG. 2 is a diagrammatic perspective view, illustrating the invention, wherein the outer canopy is in place, and wherein the portable enclosure according to the present invention is ready to be transported.

Referring to FIG. 2, a canopy 30 is mounted outside the primary housing 14 and is entirely rearwardly slidable thereupon by means of the roller track 18 illustrated in FIG. 1 in a manner well known by those of ordinary skill in the art. As illustrated in FIG. 2, the canopy is fully forward on the primary housing 14. The canopy 30 comprises an air exhaust cutout 31 for allowing the air exhaust unit 17 to extend above the canopy 30 when the canopy 30 is slid fully forward on the primary housing 14.

Referring to FIG. 3, it is apparent that the canopy 30 comprises a top panel 32 which has the air exhaust cutout 31, and a pair of side panels 34. Each of the side panels 34 is actually a tri-partite construction, comprising an upper side 36, middle side 38, and lower side panel 40 which are hingeably connected. This tri-partite configuration actually allows for the creation of a enclosure that is wider than the truck 12. This allows a workpiece such as an automobile to be fully enclosed by the canopy, with clearance for working. The upper side panel 36 swings outward to increase the width of the enclosure. The middle side panel 38 forms most of the overall height of the enclosure. The lower side panel 40 ensures that the enclosure reaches the ground beneath the truck 12. During transit, the lower side panel 40 is tucked between the middle side panel 38 and the primary housing 14.

FIG. 4 illustrates deployment of the canopy 30, wherein the canopy 30 has been slid rearwardly upon the roller track 18 of the primary housing 14. First, the middle side 38 and lower side panels 40 are locked into position, and support posts 42 are adjusted into place. Then, the truck 12 is carefully driven forward until the canopy 30 cannot travel rearwardly any further upon the roller track 18. The top panel 32 includes a slidable fan panel 33 adjacent to the air exhaust cutout 31 in the top panel 32. The slidable fan panel 33 is normally retracted within the top panel 32 when the canopy 30 is fully forward on the primary housing 14. The slidable fan panel 33 is extendible to cover the air exhaust cutout 31 when the canopy 30 is deployed rearward of the primary housing 14. Additional unnamed panels may be unfolded from other panels as illustrated in FIG. 4 to complete the enclosure as much as possible.

Referring back to FIG. 1, a floor tarpaulin 50 is preferably used to line the ground beneath the enclosure. The floor tarpaulin may include auxiliary tarpaulin sections 52 for additional weather and airflow control, especially when the enclosure is used as a spray booth. Also illustrated, sheeting roll holders 56 are provided at the primary housing rear 14R which dispense disposable sheeting for covering inside the enclosure prior to any spraying operation taking place.

FIG. 5 and FIG. 6 illustrate deployment of the mobile booth 10 as a semi-permanent enclosure, which involves removal of the mobile booth 10 from the truck 12. As illustrated, the mobile booth 10 has hydraulic jacks 60 which extend downwardly from the primary housing 14. These hydraulic jacks 60 are normally retracted, as illustrated in FIG. 5. However, when the hydraulic jacks 60 are selectively actuated, they extend downward to meet the ground beneath the truck 12, and push downward upon the ground beneath the truck 12 to actually raise the primary housing 14 slightly—just enough to bring the housing upward free of the truck 12. Just prior to, or just after taking this action, chassis pins are removed, and the truck is slowly driven away, leaving the primary housing 14 self supported upon the hydraulic jacks 60. It is important to note that other types of jacks, including hand operated jacks, may be used as a less effective but equivalent structure, and thus is still well within the scope of the invention.

In accordance with the primary objects of the invention, ventilation and filtration systems, lighting, power, air compressors, garbage collection, and supplies are provided by and contained within the primary housing to make the mobile booth 10 a truly self-contained workplace.

In conclusion, herein is presented a mobile booth which is carried by a truck, and allows creation of a temporary enclosure that is wider than the truck, and provides a controlled environment which is suitable for performing spray operations on a relatively large workpiece.

What is claimed is:

1. A mobile booth that is carried by a truck for creating an enclosure at a remote location, comprising:

a primary housing that is rigidly attached onto the truck, defining a primary housing interior;

a canopy which extends over the housing, comprising a top panel and side panels, the top panel hingeably connected to the side panels, and the side panels having a mid side panel and a lower side panel, the lower side panel is hingeably connected to the mid side panel so that the lower side panel may be folded up against the mid side panel for storage and during transport and may be lowered to extend to the around when the canopy is deployed;

a roller track between the primary housing and canopy for allowing the canopy to be deployed by sliding rearwardly on the primary housing and create the enclosure rearward of the primary housing, between the canopy and ground beneath the canopy.

2. The mobile booth as recited in claim 1, wherein the side panels further comprise an upper side panel hingeably connected between the mid side panel and top panel, for allowing the enclosure created by the canopy to be wider than the truck.

3. The mobile booth as recited in claim 2, wherein the primary housing has at least one rear access door which provides direct communication between the primary housing interior and the enclosure when the canopy is deployed.

4. The mobile booth as recited in claim 3, wherein the primary housing has an air exhaust unit extending through the primary housing roof, and wherein the top panel of the canopy has an air exhaust cutout for allowing the air exhaust unit to extend above the top panel when the canopy is slid fully forward on the primary housing.

5. The mobile booth as recited in claim 4, wherein the top panel of the canopy further comprises a slidable fan panel which is normally retracted within the top panel adjacent to the air exhaust cutout when the canopy is fully forward on the primary housing, and which is extendible to cover the air exhaust cutout when the canopy is deployed rearward of the primary housing.

6. The mobile booth as recited in claim 5, further comprising sheeting roll holders at the primary housing rear for dispensing sheeting for covering inside the enclosure.

7. The mobile booth as recited in claim 6, further comprising hydraulic jacks which extend downward from the primary housing, the hydraulic jacks are normally retracted but may be lowered to meet the ground beneath the truck.

8. The mobile booth as recited in claim 7, wherein the hydraulic jacks may be lowered to meet the ground and push the primary housing upward and free of the truck so that the truck may be driven away, leaving a semi-permanent installation.

* * * * *